United States Patent
Kanada

(10) Patent No.: US 8,429,289 B2
(45) Date of Patent: Apr. 23, 2013

(54) INFORMATION PROCESSING APPARATUS AND METHOD, PROGRAM, AND INFORMATION PROCESSING SYSTEM AND METHOD

(75) Inventor: Mizuki Kanada, Kanagawa (JP)

(73) Assignee: Sony Corporation, Tokyo (JP)

( * ) Notice: Subject to any disclaimer, the term of this patent is extended or adjusted under 35 U.S.C. 154(b) by 228 days.

(21) Appl. No.: 12/396,785

(22) Filed: Mar. 3, 2009

(65) Prior Publication Data
US 2009/0257739 A1    Oct. 15, 2009

(30) Foreign Application Priority Data
Apr. 14, 2008 (JP) ................................. 2008-104497

(51) Int. Cl.
*G06F 15/16* (2006.01)
(52) U.S. Cl.
USPC ............................ 709/233; 709/232; 370/230
(58) Field of Classification Search .......... 709/230–235; 370/229–234
See application file for complete search history.

(56) References Cited

U.S. PATENT DOCUMENTS

| | | | | |
|---|---|---|---|---|
| 7,257,121 B2* | 8/2007 | Kuhl et al. | ................. | 370/395.5 |
| 7,773,509 B2* | 8/2010 | Rahman et al. | ............... | 370/230 |
| 8,094,647 B2* | 1/2012 | Elliott et al. | .................. | 370/352 |
| 2007/0192330 A1 | 8/2007 | Kanada et al. | | |
| 2007/0223437 A1* | 9/2007 | Virgile | ............ | 370/338 |
| 2009/0259424 A1* | 10/2009 | Dutta et al. | ..................... | 702/85 |
| 2010/0020681 A1* | 1/2010 | Nakashima et al. | ........... | 370/229 |

FOREIGN PATENT DOCUMENTS

JP        2007-201884        8/2007

OTHER PUBLICATIONS

Office Action issued Sep. 6, 2012 in Japanese Patent Application No. 2008-104497.
U.S. Appl. No. 12/396,785, filed Mar. 3, 2009, Kanada.
Japanese Office Action of Dec. 27, 2012 issued in Japanese Application No. 2008-104497, filed Apr. 14, 2008. (without English translation).

* cited by examiner

*Primary Examiner* — Mohamed Ibrahim
(74) *Attorney, Agent, or Firm* — Oblon, Spivak, McClelland, Maier & Neustadt, L.L.P.

(57) ABSTRACT

Disclosed herein is an information processing apparatus including: a setting section configured to set as a first parameter at least a tolerable maximum latency time representative of a network profile for use within an end point in a network environment; a control section configured to control the transmission of target data by performing real-time control based on the first parameter set by the setting section; a conversion section configured to convert the first parameter into a second parameter for controlling the quality of service on paths of the network; and a transmission section configured to transmit onto the network the target data furnished with the second parameter derived from the conversion by the conversion section.

20 Claims, 11 Drawing Sheets

F I G . 6

| PROFILE NO. | RTP'S USED INSIDE COMMUNICATION DEVICE 31 | | | QoS CONTROL PARAMETERS FOR NETWORK PATHS | | |
|---|---|---|---|---|---|---|
| | PRECEDENCE | MAXIMUM LATENCY | FREQUENCY BAND | DSCP | VLAN User Priority | TOS VALUE |
| 1 | 1 | 200μsec | 512Kbps | AF11 | 7 | 7 |
| 2 | 2 | 2msec | 200Mbps | AF21 | 4 | 4 |
| 3 | 3 | 16msec | 500Mbps | AF31 | 2 | 2 |

FIG.8

| DATA ID | PROFILE NO. |
|---|---|
| 0 | 1 |
| 1 | 1 |
| 2 | 1 |
| 10 | 2 |
| 11 | 2 |
| 30 | 3 |
| 40 | 3 |

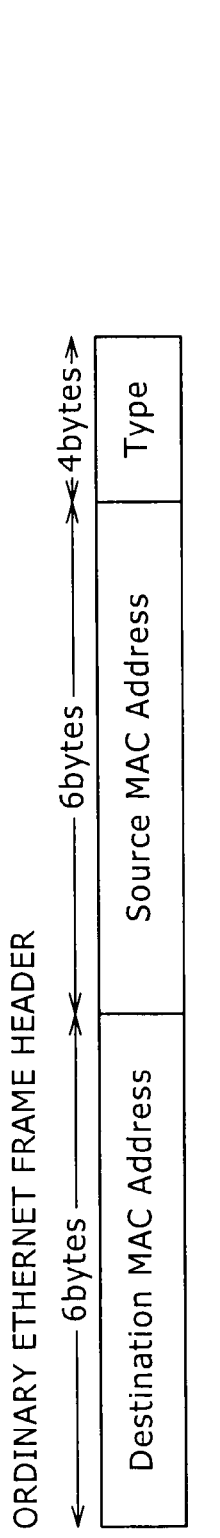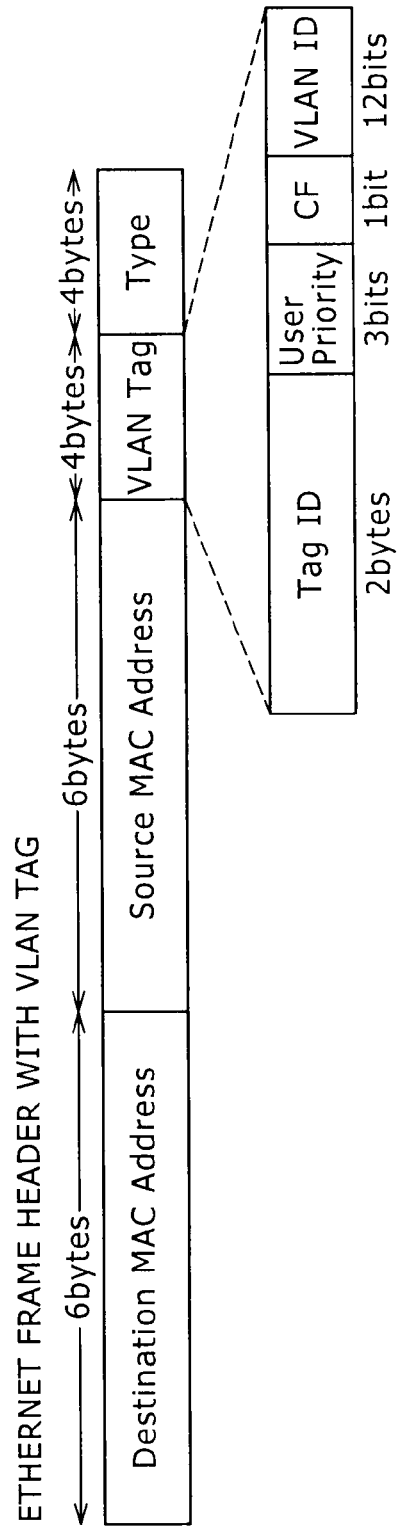
FIG. 9A
ORDINARY ETHERNET FRAME HEADER
FIG. 9B
ETHERNET FRAME HEADER WITH VLAN TAG

FIG.10

| Version | IHL | TOS/DSCP | Total Length |
| --- | --- | --- | --- |
| Identification | | Flags | Fragment Offset |
| TTL | Protocol | | Header Checksum |
| Source IP Address | | | |
| Destination IP Address | | | |

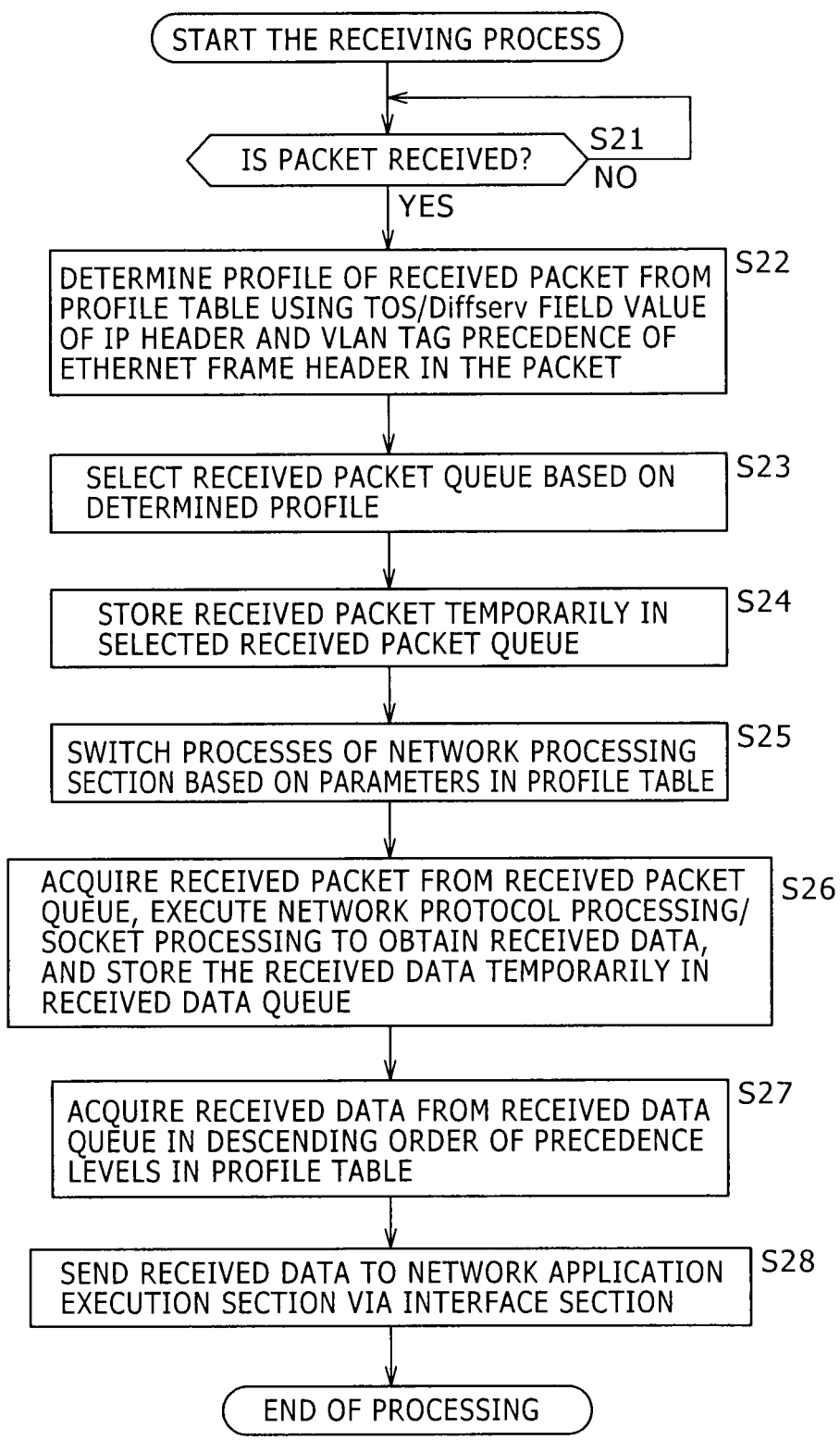

INFORMATION PROCESSING APPARATUS AND METHOD, PROGRAM, AND INFORMATION PROCESSING SYSTEM AND METHOD

BACKGROUND OF THE INVENTION

1. Field of the Invention

The present invention relates to an information processing apparatus and method, a program, and an information processing system and method. More particularly, the invention relates to an information processing apparatus and method, a program, and an information processing system and method whereby QoS (Quality of Service) related control is provided in real time within each of end points as well as between these end points making up an entire network.

2. Description of the Related Art

FIG. 1 schematically shows a typical configuration of an ordinary AV (Audio and Video) system. The AV system in FIG. 1 is made up of pieces of business-use AV equipment such as MPEG IMX (Moving Picture Experts Group IMX) and HDCAM. More specifically, the representative AV system in FIG. 1 is constituted by such business-use AV devices as a video tape recorder (called simply as the VTR hereunder) 11, a monitor 12, another VTR 13, and a controller 14. AV data is transferred between these business-use AV devices over cables 21A through 21C dedicated to AV data transfer.

In addition to the AV data, the AV system of FIG. 1 has control commands such as RS-422 (9-Pin) commands communicated internally. If a 9-Pin command is issued and a response is not returned within 10 milliseconds, a communication error is recognized because the required levels of real-time performance are very high. The requirements are that certain processes be completed within a predetermined time period (i.e., predetermined time constraints must be met).

In order to meet the elevated requirements for real-time performance, the AV system of FIG. 1 utilizes control command cables 22A through 22C apart from the AV data transfer cables 21A through 21C. However, these two categories of cables being installed individually have led to problems associated with complicated wiring.

Hence the need for transmitting broadband data such as AV data and control commands over a single network cable in mixed fashion. The need is supposed to be met by suitable capabilities to ensure a maximum latency time in sending and receiving data including control commands, a process subject to exacting requirements for real-time performance.

To implement such capabilities illustratively involves resorting to Internet-ready priority control and quality support techniques. These techniques include Intserv and Diffserv. Intserv is a technique that envisages securing a frequency band between end points using a protocol called RSVP (Resource Reservation Protocol), thereby guaranteeing certain levels of quality of service (QoS). Intserv has yet to be commercialized because of the complexity of RSVP and other problems related to scalability and implementation of the technique. Diffserv is a technique used by routers on the network to schedule packets in accordance with the value of a DSCP field in an IP (Internet Protocol) header of each packet, thereby achieving a relative QoS guarantee.

The techniques outlined above involve control over end-to-end paths, not precedence-based control within an end point. That means it is impossible for these techniques to provide the latency time guarantee required by control commands.

An end point in this context refers to a section within a piece of AV equipment with a communication capability. An end-to-end path thus means a path between at least two different end points.

The inventors invented a technique for meeting required levels of real-time performance by speeding processes inside each end point. The invention is disclosed in Japanese Patent Laid-Open No. 2007-201884. The disclosed technique involves providing precedence control and frequency band control within each end point.

SUMMARY OF THE INVENTION

The above-cited technique, however, is limited to what takes place inside the end point. When the technique is applied to an actual system, it is difficult to implement control on network paths, i.e., control over end-to-end paths.

The present invention has been made in view of the above circumstances and provides inventive arrangements whereby real-time control such as QoS control is brought about over an entire network, not only within each end point but also between the end points making up the network.

In carrying out the present invention and according to one embodiment thereof, there is provided an information processing apparatus including: setting means for setting as a first parameter at least a tolerable maximum latency time representative of a network profile for use within an end point in a network environment; control means for controlling the transmission of target data by performing real-time control based on the first parameter set by the setting means; conversion means for converting the first parameter into a second parameter for controlling the quality of service on paths of the network; and transmission means for transmitting onto the network the target data furnished with the second parameter derived from the conversion by the conversion means.

According to another embodiment of the present invention, there is provided an information processing method as well as a program each including the steps corresponding to the operations performed by the component means of the above-outlined information processing apparatus of the invention.

Where the information processing apparatus, information processing method, or program outlined above is in use, at least a tolerable maximum latency time is set as a first parameter representative of a network profile for use within an end point in a network environment. The transmission of target data is controlled by performing real-time control based on the first parameter having been set. The first parameter is then converted to a second parameter for controlling the quality of service (QoS) on paths of the network. The target data is transmitted onto the network together with the second parameter derived from the conversion.

According to a further embodiment of the present invention, there is provided an information processing apparatus including: reception means for receiving target data transmitted together with a second parameter derived through conversion from a first parameter set at least as a tolerable maximum latency time representative of a network profile for use within an end point other than the end point constituted by the information processing apparatus in a network environment, the second parameter being intended for control of the quality of service on paths of the network; conversion means for converting into the first parameter the second parameter attached to the target data received by the reception means; and control means for controlling the reception of the target data by the reception means by performing real-time control based on the first parameter derived from the conversion by the conversion means.

According to an even further embodiment of the present invention, there is provided an information processing method as well as a program each including the steps corresponding to the operations performed by the component means of the information processing apparatus of the invention outlined above. The steps involve: receiving target data transmitted together with a second parameter derived through conversion from a first parameter set at least as a tolerable maximum latency time representative of a network profile for use within an end point other than the end point constituted by the information processing apparatus in a network environment, the second parameter being intended for control of the quality of service (QoS) on paths of the network; converting into the first parameter the second parameter attached to the target data received in the receiving step; and controlling the reception of the target data in the receiving step by performing real-time control based on the first parameter derived from the conversion in the converting step.

According to a still further embodiment of the present invention, there is provided an information processing system including a first end point and a second end point in a network environment. In the system, the first end point in the network environment sets at least a tolerable maximum latency time as a first parameter representative of a network profile for use within the end points; the first end point further controlling the transmission of target data by performing real-time control based on the first parameter; the first end point further converting the first parameter into a second parameter for control of the quality of service (QoS) on paths of the network; the first end point further transmitting onto the network the target data furnished with the second parameter derived from the conversion. And, in the system, the second end point in the network environment receives the target data from the first end point over the network; the second end point further converting into the first parameter the second parameter attached to the target data having been received; and the second end point further controlling the reception of the target data by performing real-time control based on the first parameter derived from the conversion.

According to a yet further embodiment of the present invention, there is provided an information processing method including the steps corresponding to the operations performed by the components of the above-outlined information processing system of the invention.

Where the above-outlined information processing system or information processing method corresponding thereto is in use, the first end point in the network environment sets at least a tolerable maximum latency time as a first parameter representative of a network profile for use within the end points. The first end point further controls the transmission of target data by performing real-time control based on the first parameter. The first end point further converts the first parameter into a second parameter for control of the quality of service on paths of the network. The first end point further transmits onto the network the target data furnished with the second parameter derived from the conversion. The second end point in the network environment receives the target data from the first end point over the network. The second end point further converts into the first parameter the second parameter attached to the target data having been received. The second end point further controls the reception of the target data by performing real-time control based on the first parameter derived from the conversion.

The present invention, as outlined above, makes it possible to implement real-time control within each of the end points making up a network. In particular, the invention permits real-time control such as QoS control over the entire network, not only within each end point but also between the end points making up the network.

BRIEF DESCRIPTION OF THE DRAWINGS

Further features and advantages of the present invention will become apparent upon a reading of the following description and appended drawings in which:

FIG. 6 is a tabular view showing a profile table held by a profile parameter holding section in FIG. 5;

FIG. 8 is a tabular view pairing data IDs with profile numbers;

FIGS. 9A and 9B are schematic views showing typical structures of Ethernet frame headers;

FIG. 10 is a schematic view showing a typical structure of an IP header; and

FIG. 11 is a flowchart of steps in which the communication unit of FIG. 5 functions typically as a reception unit.

DETAILED DESCRIPTION OF THE PREFERRED EMBODIMENTS

The preferred embodiments of the present invention will now be described in reference to the accompanying drawings.

Figure 2:
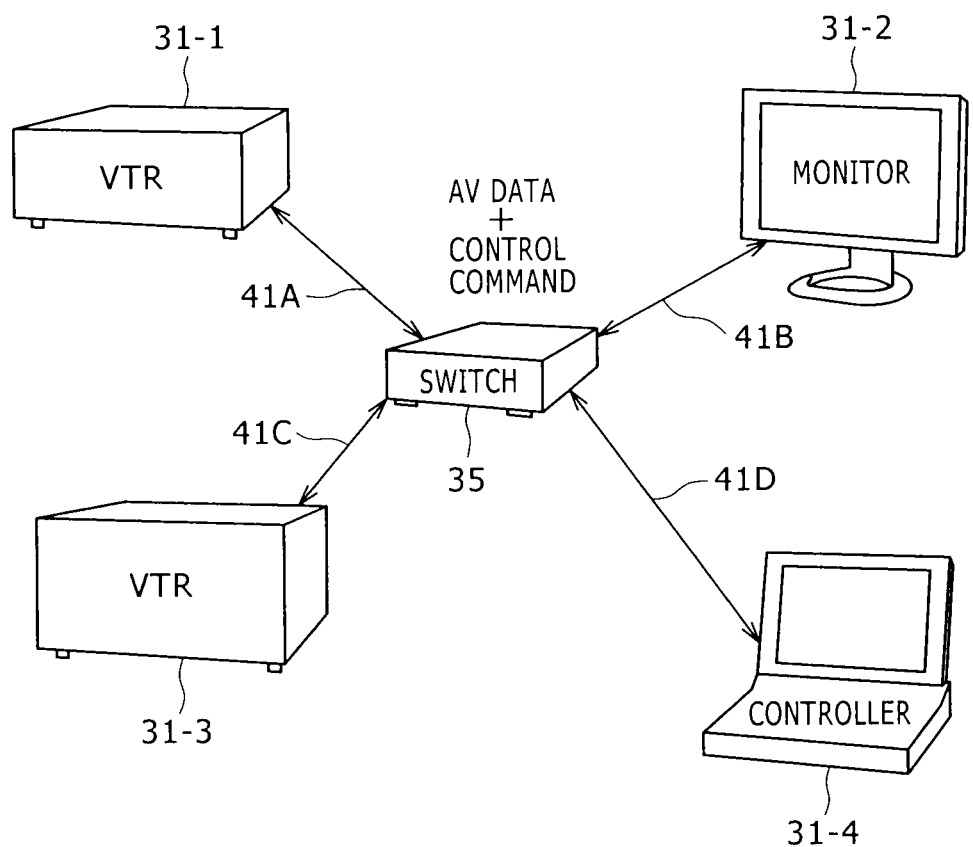
FIG. 2 is a block diagram showing a typical configuration of a transmission/reception system embodying the present invention.

FIG. 2 schematically shows a typical configuration of an AV system acting as an information processing system embodying the present invention.

Figure 1:
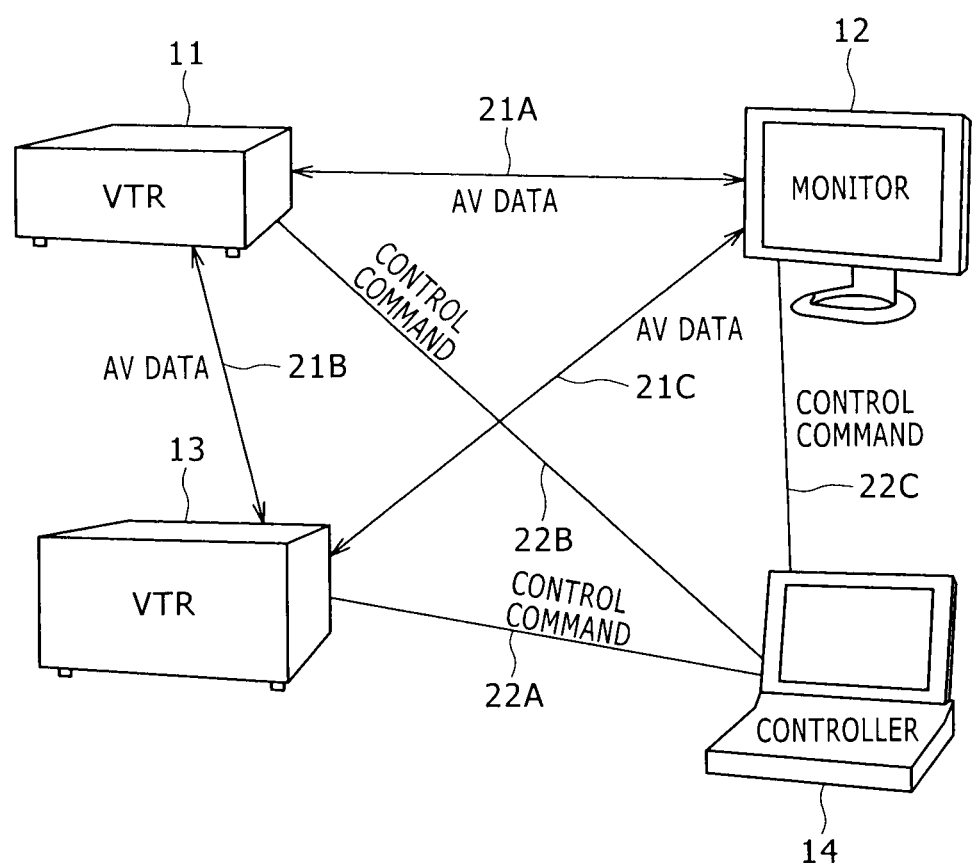
FIG. 1 is a block diagram showing a typical configuration of an ordinary transmission/reception system.

For purpose of comparison with the ordinary AV system shown in FIG. 1, the AV system of FIG. 2 is shown made up of pieces of business-use AV equipment such as a VTR 31-1, a monitor 31-2, a VTR 31-3, and a controller 31-4. These pieces of business-use AV equipment are collectively referred to as a communication device 31. AV data and control commands can be transferred between the components of the communication device 31 by means of one type of cables 41A through 41D via a switch 35. Why and how the transfer of AV data and control commands is made possible will be discussed later by referring to FIGS. 5 through 11.

Figure 3:
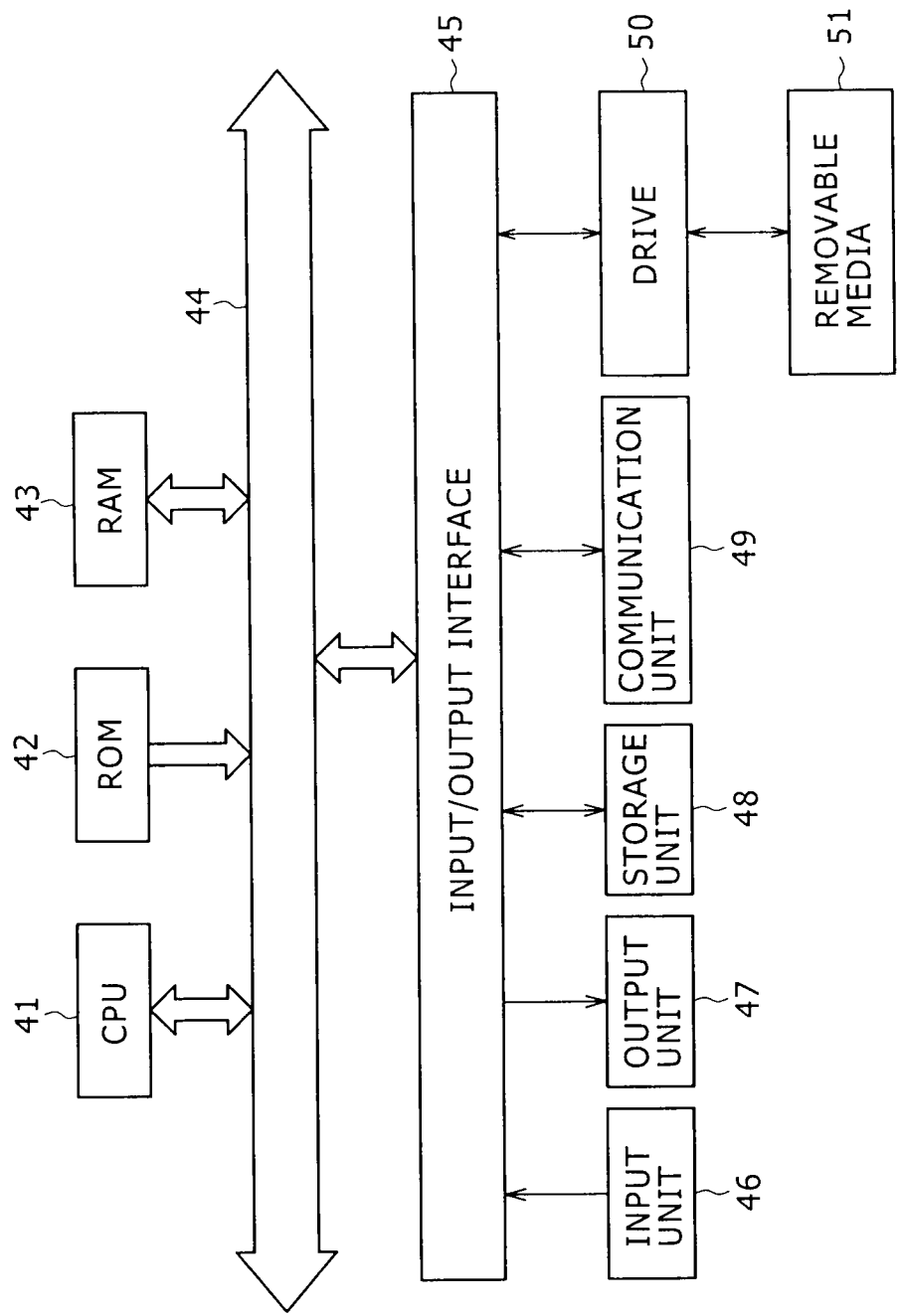
FIG. 3 is a block diagram showing a typical hardware structure of a communication device as part of the system in FIG. 2, the device serving as an information processing apparatus embodying the present invention.

FIG. 3 schematically shows a typical hardware structure of the communication device 31.

In the communication device 31 of FIG. 3, a CPU (Central Processing Unit) 41 performs various processes using the programs held in a ROM (Read Only Memory) 42 or those loaded from a recording unit 48 into a RAM (Random Access Memory) 43. The RAM 43 may also accommodate data needed by the CPU 41 in carrying out diverse processing.

The CPU 41, ROM 42, and RAM 43 are interconnected by way of a bus 44. An input/output interface 45 is also connected to the bus 44.

The input/output interface 45 is further connected with an input unit 46, an output unit 47, a recording unit 48, and a communication unit 49. The input unit 46 is typically made up of a keyboard and a mouse. The output unit 47 is generally composed of speakers and a display such as LCD (Liquid Crystal Display). The recording unit 48 is formed by a hard disk drive or the like.

The communication unit 49 is formed illustratively by an NIC (Network Interface Card) that controls communications with other blocks over a network. Details of the communication unit 49 will be discussed later. The type of network is not limited to anything specific. In the example of FIG. 2, the switch 35 and cables 41A through 41D constitute a network that interconnects the components of the communication device 31.

A drive 50 may be connected as needed to the input/output interface 45. A piece of removable media 51 such as a magnetic disk, an optical disk, a magneto-optical disk, or a semiconductor memory may be loaded into the drive 50. Computer programs read by the drive 50 from the loaded removable medium 51 are installed as needed into the recording unit 48.

The hardware structure of the communication device 31 is not limited to what is depicted in FIG. 3, as is evident from the typical structure of the communication device 31 illustrated in FIG. 2. It should be noted that each of the components making up the communication device 31 has at least a specific functional structure to be discussed later in reference to FIG. 5.

Figure 4:
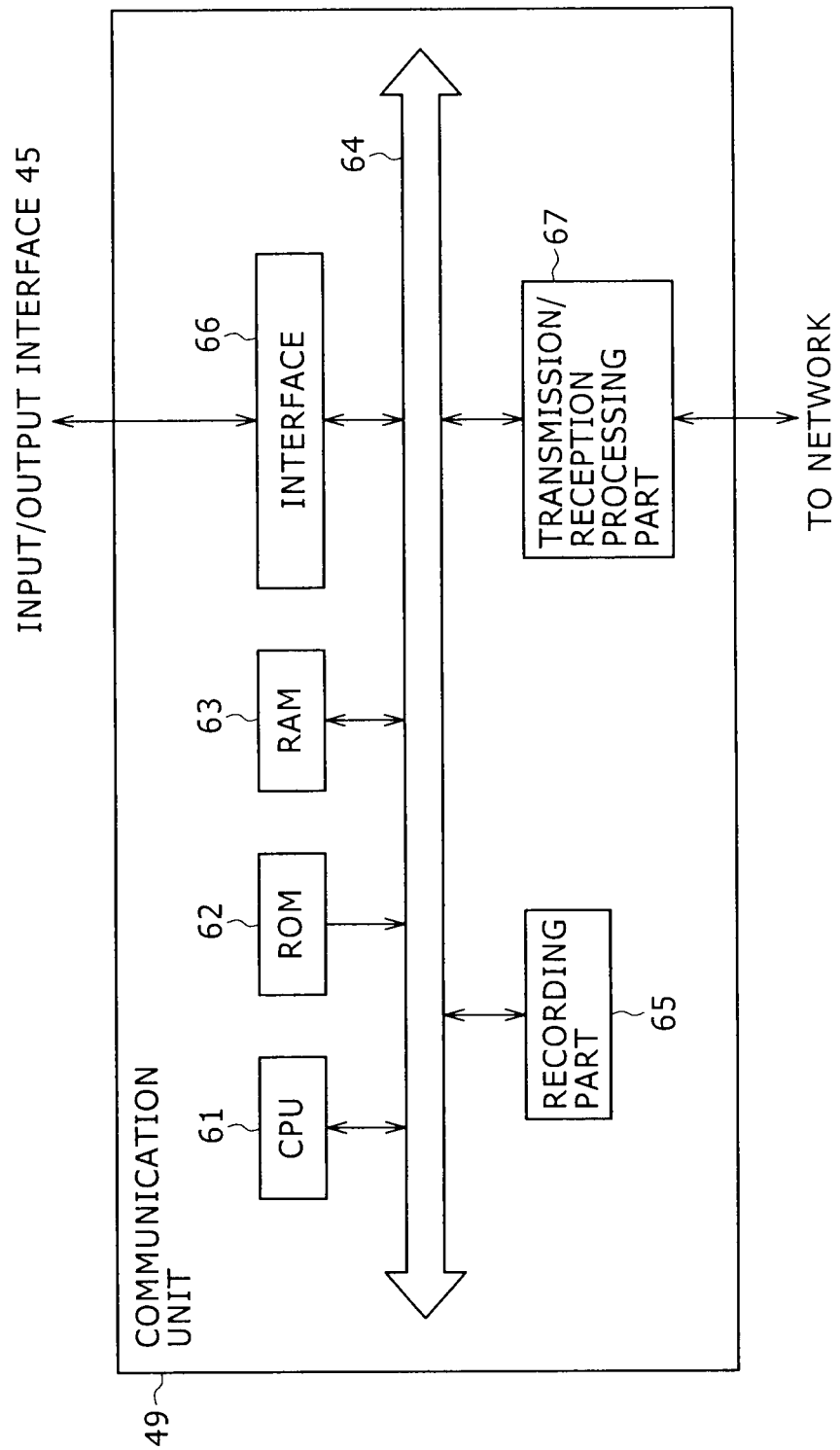
FIG. 4 is a block diagram showing a detailed hardware structure of a communication unit as part of the communication device in FIG. 3.

FIG. 4 schematically shows a detailed hardware structure of the communication unit 49.

The communication unit 49, connected to the input/output interface 45 (FIG. 2), transmits the data coming from the CPU 41 (FIG. 2) to another communication device 31 over the network to which the latter is connected. The communication unit 49 also receives data from the other communication device 31 on the network and feeds the received data to the CPU 41. In addition, the communication unit 49 may perform protocol stack processing (predetermined processes related to protocol stacks) illustratively under TCP/IP (Transmission Control Protocol/Internet Protocol).

The communication unit 49 is structured to include a CPU 61, a ROM 62, a RAM 63, a recording part 65, an interface 66, and a transmission/reception processing part 67. The CPU 61, ROM 62, RAM 63, recording part 65, interface 66, and transmission/reception processing part 67 are interconnected via a bus 64.

In the communication unit 49 of FIG. 4, the CPU 61 performs various processes using the programs held in the ROM 62 or those loaded from the recording part 65 into the RAM 63. The RAM 63 may also accommodate data needed by the CPU 61 in carrying out diverse processing.

Illustratively, the transmission/reception processing part 67 under control of the CPU 61 performs predetermined processing to transmit data to another communication device 31 over the network to which the latter is connected, or to receive data from the other communication device 31 on the network.

The hardware structure of the communication unit 49 is not limited to what is shown in FIG. 4. In hardware terms, the communication unit 49 need only have at least part of the functional structure to be discussed later in reference to FIG. 5.

Figure 5:
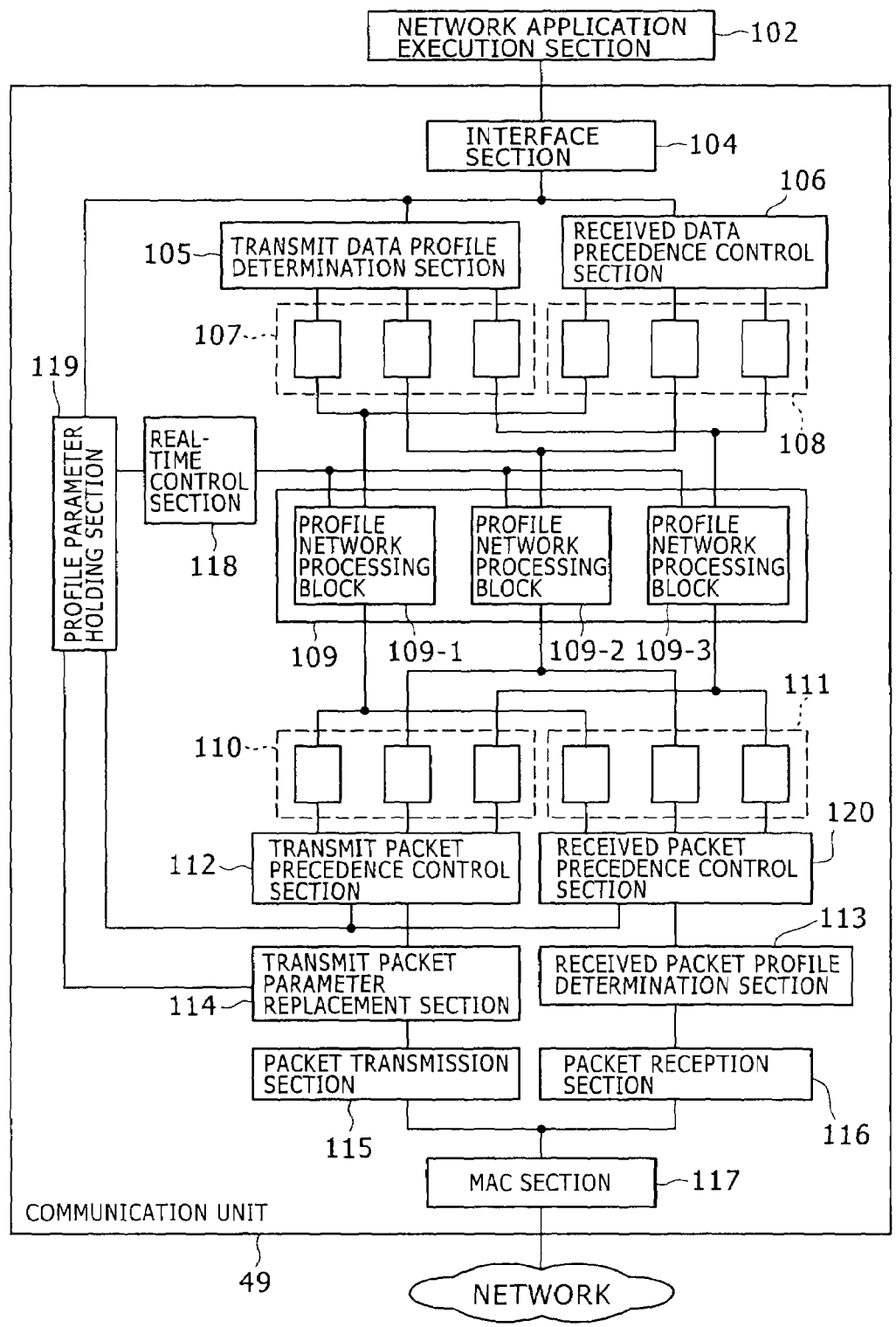
FIG. 5 is a functional block diagram showing a typical functional structure of the communication unit in FIG. 4.

FIG. 5 schematically shows a typical functional structure made up of part of the functions possessed by the communication device 31 of which the hardware structure is shown in FIGS. 3 and 4. The functional structure of FIG. 5 is needed to implement the capability of communicating with another communication device 31 via the network.

In the example of FIG. 5, the communication device 31 is structured to include a network application execution section 102 and the communication unit 49. In the structure of FIG. 5, only the network application execution section 102 is furnished outside the communication unit 49. The other functional sections ranging from an interface section 104 to a profile parameter holding section 119 are contained within the communication unit 49.

In other words, in the example of FIG. 5, solely the network application execution section 102 runs on application software under control of the operating system executed by the CPU 41 (FIG. 3). The other components ranging from the interface section 104 to the profile parameter holding section 119 function under control of the CPU 61 of the communication unit 49 (FIG. 4).

The individual functions (workings) of the functional blocks shown in FIG. 5, to be explained later by referring to FIGS. 5 through 11, are thus not described here.

In an information processing system (e.g., AV system of FIG. 2) including the communication device 31 having the functional structure such as one shown in FIG. 5, the network application software of the communication device 31 includes the capability of setting RTPs (Real Time Parameters) for use in conducting communications. The network application software is executed by the network application execution section 102.

The RTPs (Real Time Parameters) are parameters representative of network properties for use by the communication device 31 in transmitting and receiving data at an end point (i.e., end device such as the communication unit 49 shown in FIGS. 3 through 5) in a network environment. The network properties illustratively include a precedence level, a frequency range for use, and a tolerable maximum latency time.

With the embodiment of this invention, a plurality of data items sharing the same network properties (RTPs such as the precedence level and frequency range) are handled as a single entity called a profile.

In this context, the communication device 31 working as an end device on the network can perform real-time control (precedence control and frequency band control) on a profile-by-profile basis.

The communication device 31 has a correspondence table that lists profiles in association with QoS control parameters for the network paths of TOS, Diffserv, VLAN, etc. This table is called a profile table.

Based on the profile table, the communication device 31 may attach suitable QoS control parameters to outgoing packets destined for the network paths of TOS, Diffserv, VLAN, etc.

Also based on the profile table, the communication device 31 may determine the profile to be used for real-time control within the device 31 upon receipt of an incoming packet together with the QoS control parameters attached thereto, i.e., parameters for the network paths of TOS, Diffserv, VLAN, etc.

How the profile table is established will now be described.

The network application executed by the network application execution section 102 (the application is interpreted simply as the workings of the section 102 hereunder) sets RTPs (precedence level, frequency range, maximum latency time) for use within the communication device 31 in conjunction with QoS control parameters for the network paths of TOS, Diffserv, VLAN, etc. on a profile-by-profile basis, to the profile parameter holding section 119 by way of the interface section 104.

Given the parameters thus established, the profile parameter holding section 119 updates and holds the profile table.

FIG. 6 shows a typical profile table held by the profile parameter holding section 119. The profile table in FIG. 6 includes major items "profile numbers," "RTPs used inside the communication device 31," and "QoS control parameters for network paths." Subsumed under the item "RTPs used inside the communication device 31" are subordinate items "precedence level," "frequency range," and "maximum latency time." Under the item "QoS control parameters for network paths" come subordinate items "DSCP," "VLAN user priority," and "TOS value." Each row in the profile table of FIG. 6 contains the values of the above-mentioned items for a single profile.

Figure 7:
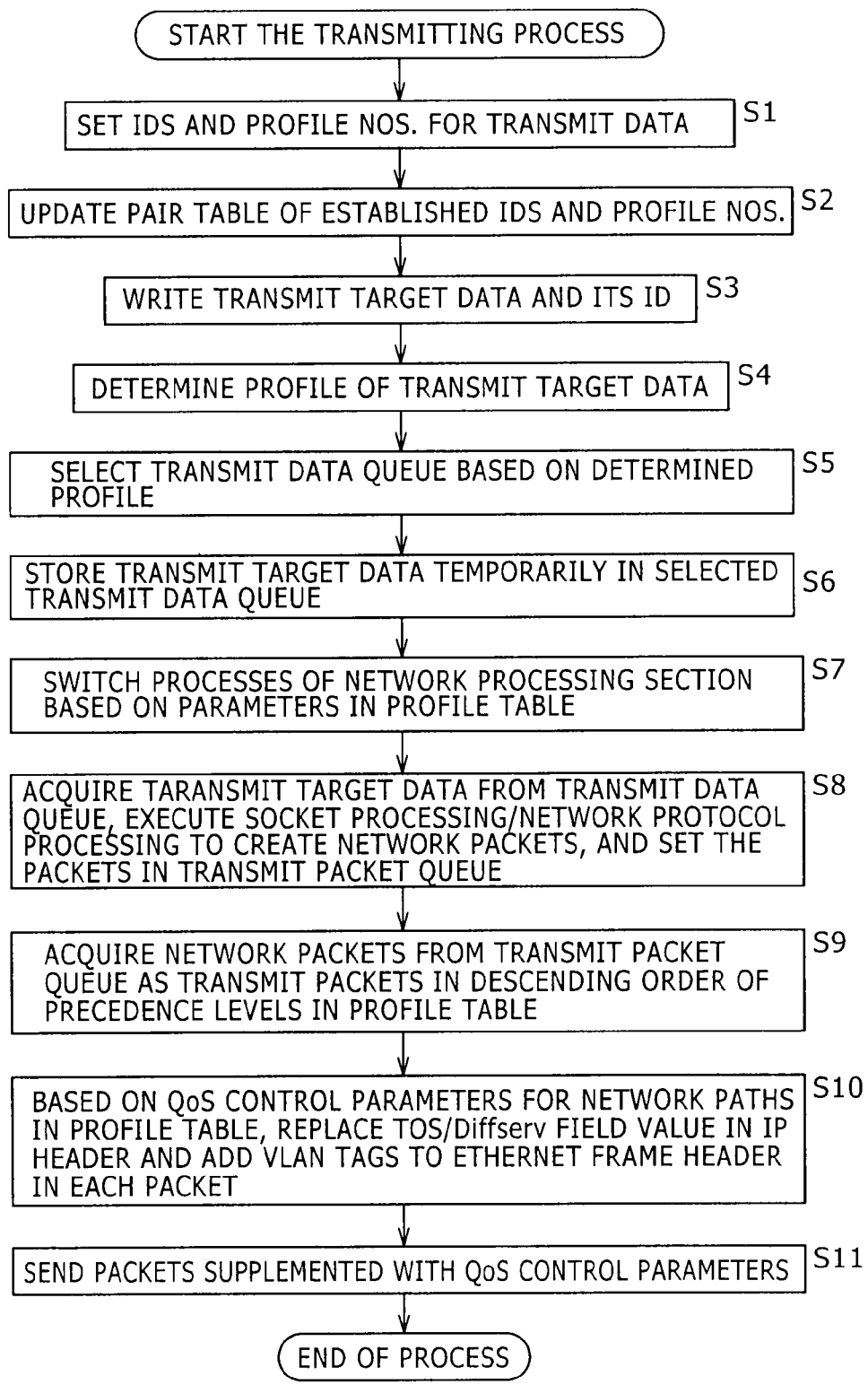
FIG. 7 is a flowchart of steps in which the communication unit of FIG. 5 functions typically as a transmission unit.

Described below in reference to FIG. 7 is how the communication device 31 functions as a transmission device performing a transmitting process, with the above-described profile table held in the profile parameter holding section 119.

In step S1, the network application execution section 102 sets the IDs and profile numbers of transmit data to the profile parameter holding section 119 through the interface section 104. The transmit data refers to the target data to be transmitted. In the description that follows, it is assumed that the transmit target data is selected from the transmit data to which the IDs and profile numbers have been set in step S1.

Figure 8:
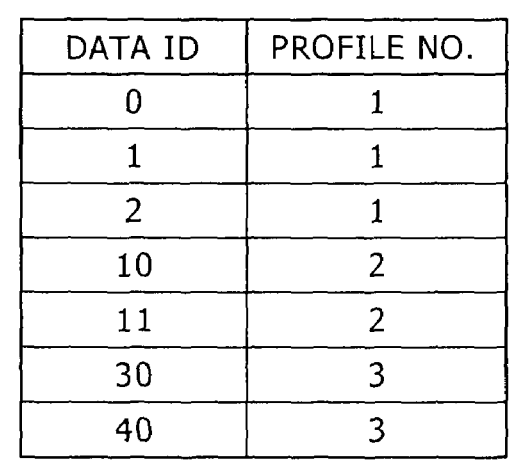

In step S2, the profile parameter holding section 119 updates a pair table that pairs the established IDs with the corresponding profile numbers. FIG. 8 shows a typical pair table in which data IDs are listed in conjunction with profile numbers.

In step S3, the network application execution section 102 writes the transmit target data and its ID to the interface section 104.

In step S4, a transmit data profile determination section 105 determines the profile of the transmit target data based on the ID of the data and on the pair table held by the profile parameter holding section 119.

In step S5, the transmit data profile determination section 105 selects a transmit data queue 107 based on the determined profile. The transmit data queue 107 associates each profile with a memory that temporarily stores the transmit target data. In the example of FIG. 5, three memories are shown furnished for the transmit data queue 107 with regard to three profiles in the profile table of FIG. 6. Of the three memories, one that corresponds to the determined profile (i.e., one of profiles Nos. 1 through 3 in FIG. 6) is selected. This is what actually takes place when the transmit data queue 107 is selected.

In step S6, the transmit data profile determination section 105 stores the transmit target data temporarily in the selected transmit data queue 107. What actually takes place in this step is that the transmit target data is placed temporarily into one of the three memories which corresponds to the determined profile (i.e., one of profile Nos. 1 through 3 in FIG. 6).

In step S7, a real-time control section 118 switches processes of a network processing section 109 based on the parameters of the profile table held by the profile parameter holding section 119.

In step S8, the network processing section 109 acquires the transmit target data from the transmit data queue 107, performs socket processing and network protocol processing to create network packets, and sets the packets to a transmit packet queue 110.

The network processing section 109 has profile network processing blocks 109-1 through 109-3.

The profile network processing block 109-1 addresses one of the three memories of the transmit data queue 107, i.e., the memory corresponding to the profile with profile No. 1 in FIG. 6. The profile network processing block 109-1 carries out socket processing and network protocol processing on the transmit target data placed in the memory being addressed, using as RTPs the items under the major item "RTPs used inside the communication device 31" corresponding to the profile with profile No. 1. This creates network packets that are set in the transmit packet queue 110.

The profile network processing block 109-2 addresses another one of the three memories of the transmit data queue 107, i.e., the memory corresponding to the profile with profile No. 2 in FIG. 6. The profile network processing block 109-2 carries out socket processing and network protocol processing on the transmit target data placed in the memory being addressed, using as RTPs the items under the major item "RTPs used inside the communication device 31" corresponding to the profile with profile No. 2. This creates network packets that are set in the transmit packet queue 110.

The profile network processing block 109-3 addresses another one of the three memories of the transmit data queue 107, i.e., the memory corresponding to the profile with profile No. 3 in FIG. 6. The profile network processing block 109-3 carries out socket processing and network protocol processing on the transmit target data placed in the memory being addressed, using as RTPs the items under the major item "RTPs used inside the communication device 31" corresponding to the profile with profile No. 3. This creates network packets that are set in the transmit packet queue 110.

The transmit packet queue 110 has a memory furnished corresponding to each of different profiles. These memories are intended temporarily to retain network packets. In keeping with three profiles in the profile table of FIG. 6, the setup of FIG. 5 has three memories provided for the transmit packet queue 110. One of the three memories is set temporarily with network packets created by the profile network processing block 109-$k$ ($k$ is an integer of 1 through 3) that corresponds to the profile (with profile No. $k$ in FIG. 6) associated with the memory in question. This is what actually takes places when network packets are set in the transmit packet queue 110.

Based on the parameters in the profile table held by the profile parameter holding section 119, the real-time control section 118 effects control in a manner switching the profile network processing blocks 109-1 through 109-3 as needed. This provides precedence control, latency guarantee control, and frequency band control on the transmit data.

In step S9, a transmit packet precedence control section 112 fetches transmit packets from the transmit packet queue 110 in descending order of precedence levels in the profile table held by the profile parameter holding section 119. The fetched transmit packets are handed over to a transmit packet parameter replacement section 114.

In step S10, based on the "QoS control parameters for network paths" in the profile table held by the profile parameter holding section 119, the transmit packet parameter replacement section 114 replaces the TOS/Diffserv field value in the IP header and adds a VLAN tag to the Ethernet frame header in the header of each transmit packet.

That is, a VLAN tag-furnished Ethernet frame header shown in FIG. 9B is created from the ordinary Ethernet frame header indicated in FIG. 9A in step S10.

The ordinary Ethernet header in FIG. 9A is constituted, from left to right, by a six-byte "Destination MAC Address" field, a six-byte "Source MAC Address" field, and a four-byte "Type" field.

The VLAN tag-furnished Ethernet frame header in FIG. 9B, on the other hand, is supplemented with a four-byte "VLAN Tag" field inserted between the "Source MAC Address" field and the "Type" field of the ordinary Ethernet frame header in FIG. 9A.

The "VLAN Tag" field is constituted, from left to right, by a two-byte "Tag ID" field, a three-bit "User Priority" field, a one-bit "CF" field, and a 12-bit "VLAN ID" field. Into the "User Priority" field is placed the value of the item "VLAN user priority" that comes under the item "QoS control parameters for network paths" in the profile table held by the profile parameter holding section 119.

The IP header is a header structured as shown in FIG. 10. Into the third field "TOS/DSCP" from left (i.e., TOS/Diffserv field) is placed the value of the item "VLAN user priority" that comes under the item "QoS control parameters for network paths" in the profile table held by the profile parameter holding section 119.

The transmit packets furnished with the QoS control parameters in the manner described above are transferred from the transmit packet parameter replacement section 114 to a packet transmission section 115. At this point, control is passed from step S10 to step S11.

In step S11, the packet transmission section 115 transmits the packets supplemented with the QoS control parameters onto the network through a MAC (Media Access Control address) section 117.

This step completes the transmitting process outlined in FIG. 7.

Each packet transmitted by the transmitting process shown in FIG. 7 is received by another communication device 31 over the network. The communication unit 49 of the receiving communication device 31 then functions as a reception unit that carries out a receiving process such as one outlined in the flowchart of FIG. 11. The receiving process is performed by the communication device 31 acting as a reception device, with the profile table held by the profile parameter holding section 119.

In step S21, a packet reception section 116 checks whether any packet is received. If no packet is found to be received ("No" in step S21), then control is returned to step S21 and the check is repeated. In other words, the check in step S21 is repeated until any packet is found to be received by the packed reception section 116 from the network through the MAC section 117, with the receiving side remaining in a wait state as indicated in FIG. 11.

Upon receipt of a packet by the packet reception section 116 from the network by way of the MAC section 117, the result of the check in step S21 becomes affirmative ("Yes") and step S22 is reached. In step S22, the received packet is forwarded from the packet reception section 116 to a received packet profile determination section 113.

In step S22, the received packet profile determination section 113 determines the profile of the received packet based on the profile table held by the profile parameter holding section 119, using the TOS/Diffserv field value and the VLAN tag precedence (VLAN user priority level) in the IP header of the received packet. The profile thus determined is supplied to a received packet precedence control section 120. Control is then passed on to step S23.

In step S23, the received packet precedence control section 120 selects a received packet queue 111 based on the determined profile. In step S24, the received packet precedence control section 120 temporarily stores the received packet selected.

The received packet queue 111 has a memory furnished for each of the profiles involved, the memories being intended to accommodate received packets temporarily. In the example of FIG. 5, three memories are shown furnished for the received packet queue 111 in keeping with the three types of profiles listed in the profile table of FIG. 6. When the profile determined in step S22 turns out to be one with profile No. "k" in FIG. 6, the memory corresponding to the profile with profile No. "k" is selected. This is what actually takes place when the received packet queue 111 is selected. Performing step S24 involves temporarily placing the received packet into the memory associated with the profile having profile No. "k."

In step S25, the real-time control section 118 switches processes of the network processing section 109 based on the parameters in the profile table held by the profile parameter holding section 119.

In step S26, the network processing section 109 acquires the received packet from the received packet queue 111, performs network protocol processing and socket processing to obtain received data, and sets the data thus obtained to a received data queue 108.

The network processing section 109 has the profile network processing blocks 109-1 through 109-3 as mentioned above.

The profile network processing block 109-1 address one of the three memories of the received packet queue 111, the addressed memory being associated with the profile with profile No. 1 in FIG. 6. The profile network processing block 109-1 performs socket processing and network protocol processing on the received packet placed in the memory being addressed, using as RTPs the subordinate item values under the item "RTPs used inside the communication device 31" corresponding to the profile with profile No. 1 in FIG. 6. The profile network processing block 109-1 temporarily places the received data thus obtained into the received data queue 108.

The profile network processing block 109-2 address another one of the three memories of the received packet queue 111, the addressed memory being associated with the profile with profile No. 2 in FIG. 6. The profile network processing block 109-2 performs socket processing and network protocol processing on the received packet placed in the memory being addressed, using as RTPs the subordinate item values under the item "RTPs used inside the communication device 31" corresponding to the profile with profile No. 2 in FIG. 6. The profile network processing block 109-2 temporarily places the received data thus obtained into the received data queue 108.

The profile network processing block 109-3 address another one of the three memories of the received packet queue 111, the addressed memory being associated with the profile with profile No. 3 in FIG. 6. The profile network processing block 109-3 performs socket processing and network protocol processing on the received packet placed in the memory being addressed, using as RTPs the subordinate item values under the item "RTPs used inside the communication device 31" corresponding to the profile with profile No. 3 in FIG. 6. The profile network processing block 109-3 temporarily places the received data thus obtained into the received data queue 108.

The received data queue 108 is furnished with a memory for each of the profiles involved, the memories being used to store received data temporarily. In the example of FIG. 5, three memories are shown furnished for the received data queue 108 in keeping with the three types of profiles listed in the profile table of FIG. 6. The received data is placed selectively in one of the three memories for temporary storage, the selected memory being associated with the profile (i.e., one with profile No. "k" in FIG. 6) corresponding to the profile network processing block 109-k (k is one of integers 1 through 3). This is what actually takes place when the received data is stored temporarily in the received data queue 108.

The real-time control section 118 switches the profile network processing blocks 109-1 through 109-3 based on the parameters in the profile table held by the profile parameter holding section 119. This provides precedence control, latency guarantee control, and frequency band control on the received data in the same manner as on the transmit data.

In step S27, a received data precedence control section 106 acquires the received data from the received data queue 108 in descending order of the precedence levels in the profile table held by the profile parameter holding section 119.

In step S28, the received data precedence control section 106 sends the received data to the network application execution section 102 via the interface section 104.

This step completes the receiving process outlined in FIG. 11.

As described above, the embodiment of the present invention allows an end point in a network environment such as the Ethernet (registered trademark) to designate RTPs representing the desired network properties (e.g., precedence level, frequency range to be used, tolerable maximum latency time) for use by the user in transmitting and receiving data. The RTPs provide the basis for controlling the timings of data transmission and reception processing.

According to the invention, it is thus possible to guarantee the maximum latency time in transmitting and receiving data of high precedence levels inside the end device on the network.

Where large quantities of data are being transmitted or received by the end device on the network, the invention makes it possible to send or receive those types of data of which delays or jitters are desired to be minimal, with a minimum of delays or jitters as desired.

Inside the end device, the RTP settings can be made to correspond with the QoS control parameters such as TOS/Diffserv and VLAN tag. With such correspondence in effect, these QoS control parameters are attached to each of the packets to be transmitted. The receiving side may then determine the RTPs from the attached precedence settings based on the RTP/QoS control parameter correspondence.

As a result, it is possible to implement real-time control (QoS control) over the entire network; such control ranges in scope from an end device to network paths to another end device.

In the preceding examples, the RTP settings are made to correspond with the QoS parameters by use of the profile table. However, this arrangement is not limitative of the present invention. Alternatively, the transmit packet parameter replacement section 114 (FIG. 5) or the like may convert the RTP settings to the QoS control parameters or vice versa automatically, i.e., at its own discretion based on predetermined algorithms.

During high-speed reception of large quantities of data such as AV data, the inventive arrangements permit reception and execution of the data to be processed on a highly real-time basis such as control commands, with little delay. It is also possible, during high-speed transmission of large quantities of data such as AV data, to transmit with little delay the data that needs to be handled on an appreciably real-time basis such as control commands.

With the above-outlined benefits turned into a reality, it is then possible to substitute solely one type of cable for a variety of AV data cables and control command-dedicated cables used in the past. Illustratively, the AV data cables 21A through 21C supplemented with the control command cables 22A through 22C used in the past as shown in FIG. 1 can be replaced by the network cables 41A through 41D in the inventive setup depicted in FIG. 2.

The series of the steps and processes (or part of them) described above may be executed either by hardware or by software.

Where the software-based processing is to be carried out, the programs constituting the software may be either incorporated beforehand in dedicated hardware of a computer for program execution or installed upon use over a network or from a suitable recording medium into a general-purpose personal computer or like equipment capable of executing diverse functions based on the installed programs.

As shown in FIGS. 3 and 4, the recording medium is offered to users not only as removable media (package media) 51 apart from their computers and constituted by magnetic disks (including floppy disks), optical disks (including CD-ROM (Compact Disk-Read Only Memory) and DVD (Digital Versatile Disk)), magneto-optical disks (including MD (Mini-Disk)), or a semiconductor memory accommodating the programs of interest; but also in the form of the ROM 42 or 62 in FIG. 3 or the recording unit 48 or recording part 65 in FIG. 3 or 4 composed of a hard disk drive, each containing the programs and incorporated beforehand in the users' computers.

In this specification, the steps describing the programs stored on the recording medium represent not only the processes that are to be carried out in the depicted sequence (i.e., on a time series basis) but also processes that may be performed parallelly or individually and not chronologically.

In this specification, the term "system" refers to an entire configuration made up of a plurality of component devices and processing elements.

Although the communication unit 49 in FIG. 4 was shown to be one component of the communication device 31 in the foregoing description, this is not limitative of the invention. Alternatively, the communication unit 49 may be considered a single independent device as shown in FIG. 4. In this case, the communication unit 49 in FIG. 4 may be removably attached to the communication device 31. The communication unit 49 may function as an end point attached not only to the communication device 31 but also to a variety of other devices, carrying out diverse processes to conduct network communications as discussed above.

The present application contains subject matter related to that disclosed in Japanese Priority Patent Application JP 2008-104497 filed in the Japan Patent Office on Apr. 14, 2008, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An information processing apparatus comprising:
    setting means for setting as a first parameter at least a tolerable maximum latency time representative of a network profile for use locally within an end point in a network environment;
    control means for controlling transmission of target data, by performing real-time control based on said first parameter set by said setting means, locally within the end point prior to the target data being transmitted onto the network;
    conversion means for converting said first parameter into a second parameter for controlling the quality of service on paths of the network based on a profile table that lists said first parameter and said second parameter in a corresponding relationship; and transmission means for transmitting onto said network said target data furnished with said second parameter derived from the conversion by said conversion means.

2. The information processing apparatus according to claim 1, wherein said setting means further sets a precedence level as said first parameter.

3. The information processing apparatus according to claim 2, wherein said setting means further sets a frequency band for use as said first parameter.

4. The information processing apparatus according to claim 1, wherein said conversion means adopts at least a DSCP field value in an IP header under Diffserv as said second parameter subject to the conversion, the DSCP standing for Differentiated Services Code Point and IP for Internet Protocol.

5. The information processing apparatus according to claim 1, wherein said conversion means adopts at least user priority of a virtual local area network abbreviated to VLAN as said second parameter subject to the conversion.

6. The information processing apparatus according to claim 1, wherein said conversion means adopts at least a TOS value under Internet Protocol abbreviated to IP as said second parameter subject to the conversion, the TOS standing for type of service.

7. An information processing apparatus comprising:

reception means for receiving target data transmitted together with a second parameter derived through conversion from a first parameter set at least as a tolerable maximum latency time representative of a network profile for use locally within an end point other than the end point constituted by said information processing apparatus in a network environment, said second parameter being intended for control of the quality of service on paths of the network;

conversion means for converting into said first parameter said second parameter attached to said target data received by said reception means based on a profile table that lists said first parameter and said second parameter in a corresponding relationship; and control means for controlling reception of said target data by said reception means, by performing real-time control based on said first parameter derived from the conversion by said conversion means, locally within the end point constituted by said information processing apparatus after the target data is received from the network.

8. The information processing apparatus according to claim 7, wherein the other end point further sets a precedence level as said first parameter.

9. The information processing apparatus according to claim 8, wherein said other end point further sets a frequency band for use as said first parameter.

10. The information processing apparatus according to claim 7, wherein the other end point adopts at least a DSCP field value in an IP header under Diffserv as said second parameter subject to the conversion, the DSCP standing for Differentiated Services Code Point and IP for Internet Protocol.

11. The information processing apparatus according to claim 7, wherein the other end point adopts at least user priority of a virtual local area network abbreviated to VLAN as said second parameter subject to the conversion into said first parameter.

12. The information processing apparatus according to claim 7, wherein the other end point adopts at least a TOS value under Internet Protocol abbreviated to IP as said second parameter subject to the conversion into said first parameter, the TOP standing for type of service.

13. An information processing method for use with an information processing apparatus functioning as an end point in a network environment, said information processing method comprising the steps of:

setting as a first parameter at least a tolerable maximum latency time representative of a network profile for use locally within said end point;

controlling transmission of target data, by performing real-time control based on said first parameter set in said setting step, locally within the end point prior to the target data being transmitted onto the network;

converting said first parameter into a second parameter for controlling the quality of service on paths of the network based on a profile table that lists said first parameter and said second parameter in a corresponding relationship; and transmitting onto said network said target data furnished with said second parameter derived from the conversion in said converting step.

14. A non-transitory computer-readable storage medium including computer executable instructions, wherein the instructions, when executed by a computer, cause the computer to perform a method for controlling an end point in a network environment, said method comprising the steps of:

setting as a first parameter at least a tolerable maximum latency time representative of a network profile for use locally within said end point;

controlling transmission of target data, by performing real-time control based on said first parameter set in said setting step, locally within the end point prior to the target data being transmitted onto the network;

converting said first parameter into a second parameter for controlling the quality of service on paths of the network based on a profile table that lists said first parameter and said second parameter in a corresponding relationship; and transmitting onto said network said target data furnished with said second parameter derived from the conversion in said converting step.

15. An information processing method for use with an information processing apparatus constituting an end point in a network environment, said information processing method comprising the steps of:

receiving target data transmitted together with a second parameter derived through conversion from a first parameter set at least as a tolerable maximum latency time representative of a network profile for use locally within an end point other than said end point constituted by said information processing apparatus in a network environment, said second parameter being intended for control of the quality of service on paths of the network;

converting into said first parameter said second parameter attached to said target data received in said receiving step based on a profile table that lists said first parameter and said second parameter in a corresponding relationship; and controlling reception of said target data in said receiving step, by performing real-time control based on said first parameter derived from the conversion in said converting step, locally within the end point constituted by said information processing apparatus after the target data is received from the network.

16. A non-transitory computer-readable storage medium including computer executable instructions, wherein the instructions, when executed by a computer, cause the computer to perform a method for controlling an end point in a network environment, said method comprising the steps of:

receiving target data transmitted together with a second parameter derived through conversion from a first parameter set at least as a tolerable maximum latency time representative of a network profile for use locally within an end point other than said end point in said network environment, said second parameter being intended for control of the quality of service on paths of the network;

converting into said first parameter said second parameter attached to said target data received in said receiving step based on a profile table that lists said first parameter and said second parameter in a corresponding relationship; and controlling reception of said target data in said receiving step, by performing real-time control based on said first parameter derived from the conversion in said converting step, locally within the end point constituted by said information processing apparatus after the target data is received from the network.

17. An information processing system comprising:

a first end point; and a second end point in a network environment with said first end point, wherein said first end point in said network environment sets at least a tolerable maximum latency time as a first parameter representative of a network profile for use locally within the first and second end points, said first end point further controlling transmission of target data, by performing real-time control based on said first parameter, locally within the first end point prior to the target data being transmitted onto the network, said first end point further converting said first parameter into a second parameter for control of the quality of service on paths of the network based on a profile table that lists said first parameter and said second parameter in a corresponding relationship, said first end point further transmitting onto said network said target data furnished with said second parameter derived from the conversion, said second end point in said network environment receives said target data from said first end point over said network, said second end point further converting into said first parameter said second parameter attached to said target data having been received based on said profile table, and said second end point further controlling reception of said target data, by performing real-time control based on said first parameter derived from the conversion, locally within the second end point after the target data is received from the network.

18. An information processing method for use with a first end point and a second end point in a network environment, said information processing method comprising the steps of:

causing said first end point in said network environment to set at least a tolerable maximum latency time as a first parameter representative of a network profile for use locally within the end points;

causing said first end point further to control transmission of target data by performing real-time control based on said first parameter, locally within the first end point prior to the target data being transmitted onto the network;

causing said first end point further to convert said first parameter into a second parameter for control of the quality of service on paths of the network based on a profile table that lists said first parameter and said second parameter in a corresponding relationship;

causing said first end point further to transmit onto said network said target data furnished with said second parameter derived from the conversion;

causing said second end point in said network environment to receive said target data from said first end point over said network;

causing said second end point further to convert into said first parameter said second parameter attached to said target data having been received based on said profile table; and causing said second end point further to control reception of said target data, by performing real-time control based on said first parameter derived from the conversion, locally within the second end point after the target data is received from the network.

19. An information processing apparatus comprising:

a setting section configured to set as a first parameter at least a tolerable maximum latency time representative of a network profile for use locally within an end point in a network environment;

a control section configured to control transmission of target data, by performing real-time control based on said first parameter set by said setting section, locally within the end point prior to the target data being transmitted onto the network;

a conversion section configured to convert, using a processor, said first parameter into a second parameter for controlling the quality of service on paths of the network based on a profile table that lists said first parameter and said second parameter in a corresponding relationship; and a transmission section configured to transmit onto said network said target data furnished with said second parameter derived from the conversion by said conversion section.

20. An information processing apparatus comprising:

a reception section configured to receive target data transmitted together with a second parameter derived through conversion from a first parameter set at least as a tolerable maximum latency time representative of a network profile for use locally within an end point other than the end point constituted by said information processing apparatus in a network environment, said second parameter being intended for control of the quality of service on paths of the network;

a conversion section configured to convert, using a processor, into said first parameter said second parameter attached to said target data received by said reception section based on a profile table that lists said first parameter and said second parameter in a corresponding relationship; and a control section configured to control reception of said target data by said reception section by performing real-time control based on said first parameter derived from the conversion by said conversion section, locally within the end point constituted by said information processing apparatus after the target data is received from the network.

* * * * *